Nov. 7, 1972  K. W. ODEN  3,702,164

CHAIN CONTROLLED VENDER FOR STACKED ARTICLES

Filed March 18, 1971  2 Sheets-Sheet 1

INVENTOR
KENNETH W. ODEN
BY
ATTORNEYS

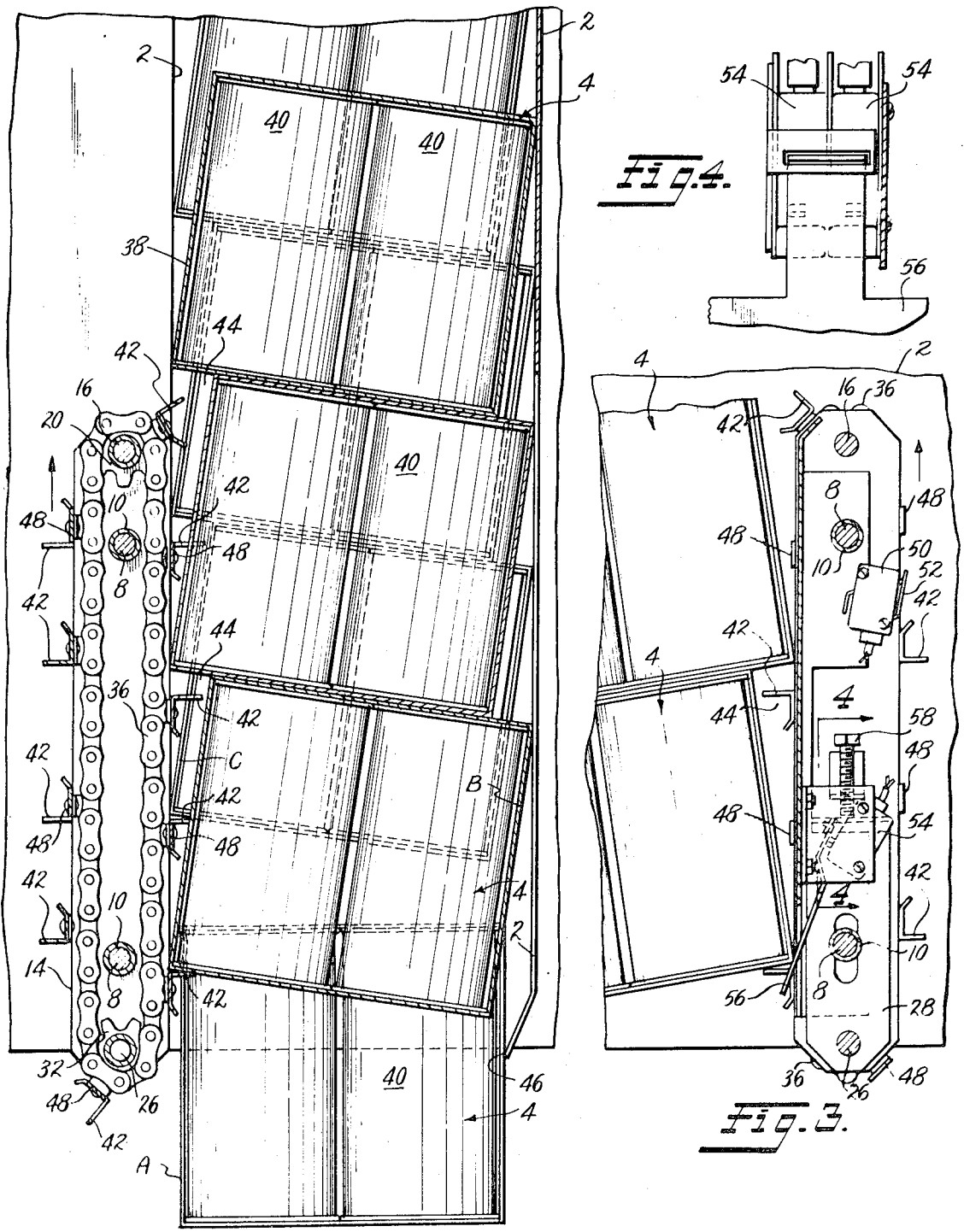

United States Patent Office 3,702,164
Patented Nov. 7, 1972

3,702,164
CHAIN CONTROLLED VENDER FOR
STACKED ARTICLES
Kenneth W. Oden, Charles Town, W. Va., assignor to
Dixie-Narco, Inc., Charles Town, W. Va.
Filed Mar. 18, 1971, Ser. No. 125,728
Int. Cl. B65h 3/30
U.S. Cl. 221—77                                8 Claims

ABSTRACT OF THE DISCLOSURE

A pair of open-bottom guide channels in a cabinet hold adjacent columns of articles, the channels being dimensioned so the articles can tilt in one direction therein. Endless chains extend along only the bottom portions of the channels and have lugs engaging one bottom edge of only the lowermost article in each column, supporting the entire column by that one article, with all articles tilted. As the chains are actuated the columns are lowered until the bottom article is discharged and the column drops onto the next lug. The lugs on the two chains are vertically staggered to discharge articles from one column then the other, alternately. The endless chain assemblies are removable as a unit from the cabinet, for service or repair.

BACKGROUND OF THE INVENTION

This invention is in the field of vending machines, and particularly machines for vending generally rectangular articles suuch as six-pack cartons of beverage cans or the like.

Vending machines for vending cartons of articles or other fairly fragile packages have been designed heretofore but in most of such devices, the articles were separately supported and individually advanced toward a desirable position. It has also been known to provide vending machines with adjacent columns of articles, from which articles were alternately dispensed at succeeding cycles of operation. Vending machines have also been produced arranged to hold relatively high columns of articles to be dispensed with conveyor chain devices extending downwardly along the column and having lugs or the like supporting the individual articles. In each cycle of operation the entire chain is advanced to lower the lowermost article to a desirable position and to deliver the same to a purchaser. However, such devices involve the provision of conveyor means extending the full height of the column of articles and any repair of the apparatus necessitated complete disassembly of the cabinet structure.

SUMMARY OF THE INVENTION

The present invention proposes a vending apparatus of the type already referred to wherein adjacent columns of articles are guided by channels in a cabinet, the channels being of a width greater than the corresponding dimension of the rectangular articles therein so that the articles supported along one bottom edge tilt in the channel in a direction away from the support means. The support means are provided by endless chain devices adjacent the bottoms of the columns and having lugs thereon, only one of which engages the bottom article of that column of articles and thus supports the entire column, each article of which is tilted forwardly and resting on the article therebelow. The chain device is caused to move downwardly during a vending cycle whereupon another lug enters the guide channel below the next succeeding article and in the space provided by the tilted articles but without effecting any support until the lowermost lug is withdrawn from the channel and the lowermost article dispensed whereupon the stack then drops onto the next above lug in preparation for a subsequent cycle. In a preferred embodiment, two such chain devices are provided on a unitary sub-frame removably mounted in the cabinet whereby it may be readily removed for service or replacement and the lugs on the adjacent chains are staggered so that articles are dispensed alternately from one column then the other during sequential cycles of operation.

BRIEF DESCRIPTION OF THE DRAWINGS

FIG. 2 is a vertical sectional view taken substantially along the line 2—2 of FIG. 1;

FIG. 3 is a fragmentary sectional view on substantially the same scale as FIG. 2 but taken along the line 3—3 of FIG. 1; and FIG. 4 is a further enlarged sectional view taken on the line 4—4 of FIG. 3.

DESCRIPTION OF A PREFERRED EMBODIMENT

Figure 1:
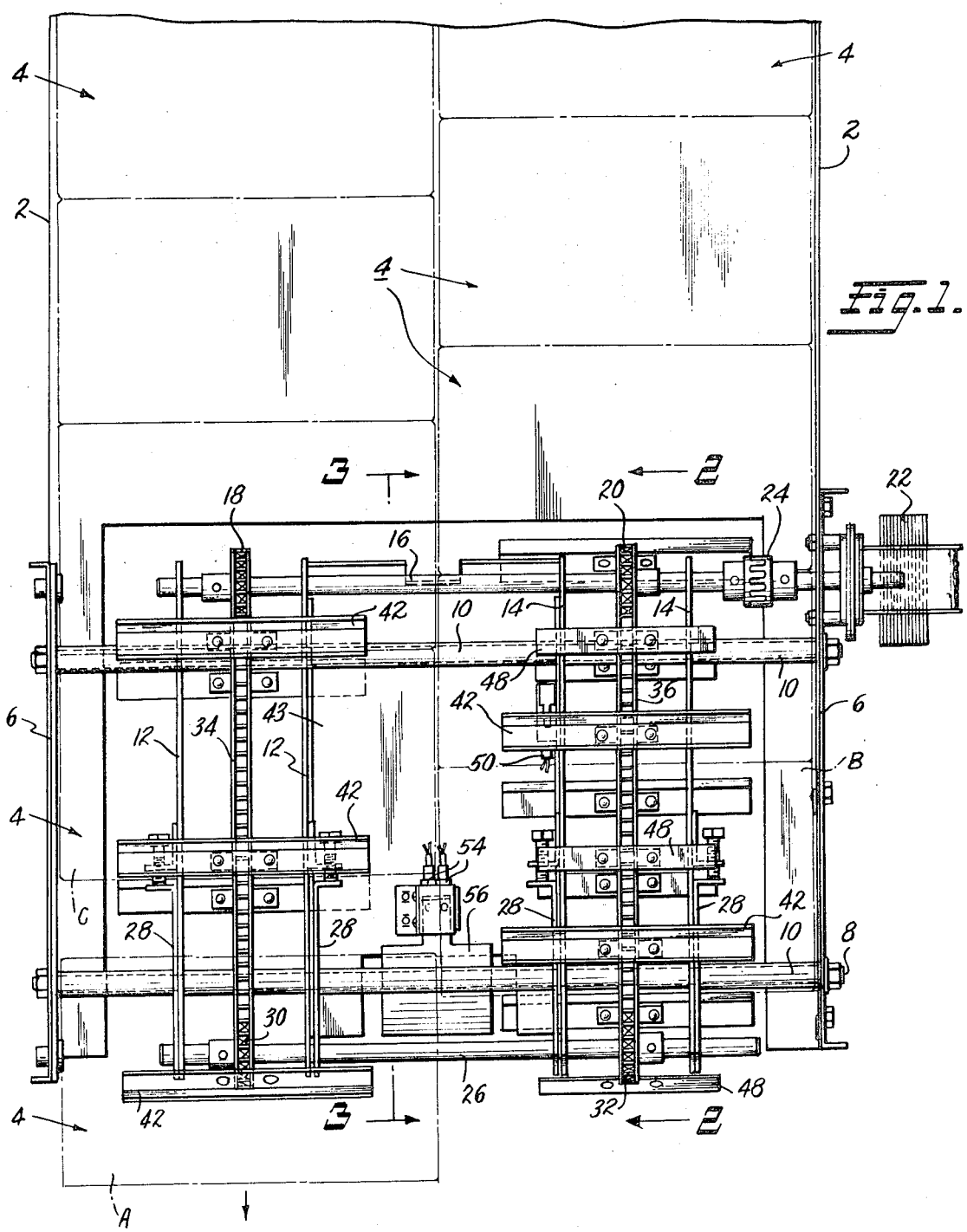
FIG. 1 is a front elevational view of the dispensing mechanism of the present invention with articles and portions of a cabinet structure shown in broken line.

In FIG. 1, numerals 2 designate side wall portions or panels of a cabinet structure defining a pair of adjacent channels for vertically guiding columns of generally rectangular articles 4. A pair of sub-frame plates 6 are removably secured to certain of the cabinet panels 2 in the lowermost regions of the columns of articles 4, and spacer means comprising threaded rods 8 and spacer tubes 10 join the plates 6 into a unitary sub-assembly. On these spacers 8–10 are further pairs of vertically extending plates 12 and 14. Extending through and journalled in the upper portions of the plates 12 and 14 is a drive shaft 16 having a pair of sprockets 18 and 20 thereon, respectively, positioned between the plates of the pairs of plates 12 and 14, as shown. A motor 22 is mounted on a frame plate 6 and drivingly connected to the shaft 16 by a suitable separable coupling 24.

A lower shaft 26 extends through and is journalled in adjustable plates 28 slidable along the lower portions of the pairs of plates 12 and 14. The shaft 26 has a pair of sprockets 30 and 32 thereon aligned with corresponding sprockets 18 and 20 on shaft 15. Endless chains 34 and 36 are trained over the aligned sprockets 18 and 30 and 20 and 32 whereby operation of motor 22 simultaneously drives the chains 34 and 36.

Refer now to FIG. 2, it will be seen that the sub-frame and chains 34 and 36 are mounted in a position adjacent but outside of the channels defining guides for the articles 4. The panels 2 defining guide channels for the articles 4 are so spaced apart, as shown in FIG. 2, that the generally rectangular articles 4 therein may tilt forwardly and downwardly at their tops to the extent indicated in the drawings.

As shown herein, the articles 4 comprise generally cubical or rectangular cartons 38 having therein six cans 40 of beverage or the like. Such articles, however, are merely illustrative and any articles of a similar nature may be dispensed. As shown in FIGS. 1 and 2, each of the chains 34 and 36 is provided with elongated transverse lugs 42, of generally L-shape, in transverse section, having a flange portion extending transversely of the chain and outwardly therefrom into respective article guide channels. Actually, the chains and a small panel 43 (FIG. 1) define a wall of the channels at the lower portion thereof. The lugs 42 on each chain are spaced apart a distance somewhat less than the height of the articles 4 and, as seen in FIG. 2, the lowermost lug 42 engages the edge portion of the bottom of the lowermost article 4 in that column whereas the next lug 42 thereabove extends freely into a space 44 created by the tilting of the articles 4 in the manner shown and without touching any of the articles. Thus, the lowermost lug 42 of the nearest column seen in FIG. 2, supports the lowermost article 4 and that article in turn supports the column of articles thereabove.

As also seen in FIGS. 1 and 2, the lugs 42 on the nearest chain 36 of FIG. 2 (right hand chain of FIG. 1) are vertically staggered with respect to the corresponding lugs 42 on the other chain, wherein it supports the rearmost column seen in FIG. 2 with the articles thereof being vertically staggered relative to the nearest column.

It is contemplated that the vending apparatus be provided with suitable coin receiving and coin controlled means for starting the motor 22 when a proper coin or the proper number of coins have been deposited in the machine. When the motor 22 is started it drives both chains in a direction to lower the stacks of articles supported thereby until the lowermost article passes through the open lower end 46 of the channel guiding that column, at which time the lug 42 supporting that lowermost article therein, moves around the lowermost sprocket and is withdrawn from the guide channel whereupon the lowermost article is discharged to a suitable location and the stack of articles thereabove drop a relatively short distance to the next lug 42 above the one previously supporting the column. At the same time a switch means, to be described, is actuated to stop operation of the motor 22 whereupon the apparatus is in condition for a further cycle of operation. In the above description, reference to the lowermost article refers to that article that is in fact lowermost of the articles in the two adjacent columns. From FIG. 2 it is apparent that the article being discharged was the lowermost article in the rearmost column, as seen in the figure, and during the discharging cycle, the articles in the nearest column were merely lowered aproximately one-half the height of an article. When the article A of FIG. 2 is discharged from the apparatus from the rear column, article B in the nearest column, is then in position to be discharged during the next cycle of operation and article C of the rear column is held a substantial distance thereabove.

It will be clear to those skilled in the art that the columns of articles may be replenished by depositing articles therein from the top of their respective guide channels whereupon they will rest upon and assume the same tilt as the articles therebelow.

As seen in FIGS. 1 and 2, the chain 36 (the nearest chain seen in FIG. 2), is provided with further transverse bar members 48 intermediate the lugs 42 on that chain. The transverse bars 48 are laterally aligned with the lugs 42 on the other chain 34. A motor control switch 50 (see FIG. 3) is mounted on one of the plates 14 and is provided with an actuating finger 52 in the path of movement of a portion of the lugs 42 and bars 48 on chain 36. The switch 50 is so arranged in the motor control circuit that it opens the circuit to the motor when the arm 52 is depressed. Thus, when either a lug 42 or bar 48 passes over the arm 52, as seen in FIG. 3, the switch 50 is opened and the motor 22 is stopped. The switch 50 is so positioned that the motor is stopped when the parts are in the position shown in FIG. 2, for example, where one of the articles has just been dispensed from the apparatus. Thus, the single switch 50 responding to both the lugs 42 on one chain and the bars 48 thereon, will stop the motor when a lug 42 on either chain has moved to a position to discharge the lowermost article from its corresponding column.

A further switch means 54 actually comprising a pair of switches is mounted on the apparatus and provided with an actuating paddle 56 of a width sufficient to extend into the path of movement of articles in both columns. The switches 54 are arranged in a suitable "sold out" circuit to disable the apparatus when no articles are in position to be dispensed, that is, when the columns are empty.

Referring now to FIG. 3, the movable plates 28, previously referred to, and in which the lowermost shaft 26 is journalled, are shown in FIG. 3. The plates 28 are slidably mounted adjacent the plates of the pairs of plates 12 and 14 and slidable therealong by means of slots embracing the spacer rods 8 and by suitable adjusting screw devices 58 to effect tightening and/or tension regulating of the chains 34 and 36.

Thus, applicant has provided a novel carton dispensing apparatus employing endless chains but wherein the endless chain devices are readily removable from a larger cabinet for easy replacement or repair and thus providing a vendor much less expensive to manufacture than similar types heretofore used and much easier to load with articles.

While a single specific embodiment of the invention has been shown and described herein, the same is merely illustrative of the principles involved.

I claim:

1. Vending apparatus for articles of generally cubical shape of predetermined dimensions, comprising:

cabinet means defining at least one upright open-bottom guide channel for guiding said articles in a vertical column, a lateral dimension of said channel being greater than the corresponding predetermined dimension of said articles whereby said articles can assume a tilted attitude in said channel;

and endless chain device having a vertical run adjacent a side of said channel and having lug means thereon extending into said channel, said lug means being spaced apart a distance less than the height of said articles whereby only the lowermost lug means engages an edge of the bottom of a lowermost article to support the same and other articles resting thereon in a tilted attitude in said channel with the tops of said articles tilted away from said chain and with the next lug means thereabove extending into said channel adjacent to but spaced a short distance below the next uppermost article and toward the adjacent tilted side of the lowermost articles;

said endless chain device extending along only the lowermost portion of said channel for a distance not substantially greater than the height of two articles; and cyclically operable motor means for selectively driving said endless chain device to move said run downwardly a distance to lower said stack of articles and withdraw said lowermost lug means from said channel and thereby discharge said lowermost article through the open bottom of said channel and drop the remainder of said stack said short distance onto the next lug means thereabove.

2. Apparatus as defined in claim 1 wherein said cabinet means defines at least two adjacent guide channels for guiding two adjacent columns of stacked articles, there being one of said endless chain devices for each guide channel and said motor means being arranged to drive both said endless chain devices simultaneously; the lug means on one of said chain devices being vertically staggered relative to the lug means on the other chain device whereby articles are alternately discharged from said channels upon successive cycles of operation of said motor means.

3. Apparatus as defined in claim 2 including motor control switch means mounted in the path of movement of the lug means of one of said chain devices for actuation thereby, and further motor control switch actuating means on said one chain device, intermediate adjacent lug means thereon and substantially laterally aligned with the lug means on the other chain device.

4. Apparatus as defined in claim 2 including switch means having an actuator arm extending into both said channels in the path of movement of articles of both columns for controlling operation of said motor means in accordance with the presence or absence of articles in said columns in position to be discharged.

5. Apparatus as defined in claim 1 wherein said endless chain device and said motor means are mounted on a sub-frame removably mounted on said cabinet means.

6. Apparatus as defined in claim 5 wherein said sub-frame comprises a pair of spaced upright end plates removably mounted in said cabinet means; spacers extending between and secured to said end plates; at least one second pair of spaced plate means mounted on said spacers; upper and lower shafts journalled in said second pair of plate means and having aligned sprockets thereon, said endless chain device being trained over said aligned sprockets; and said motor means being drivingly connected to one of said shafts and being mounted on one of said end plates.

7. Apparatus as defined in claim 6 wherein each of the plate means of said second pair comprises relatively movable members in which said shafts are respectively journalled, and means for relatively moving said members to effect adjustment of the spacing between said shafts.

8. Apparatus as defined in claim 6 wherein two pairs of said second plate means are mounted on said spacers, said upper and lower shafts extending through and being journalled in both said second pairs of second plate means; there being a pair of said sprockets and an endless chain device between the plate means of each said second pairs.

References Cited
UNITED STATES PATENTS

| | | | |
|---|---|---|---|
| 3,616,966 | 11/1971 | Schuller | 221—115 X |
| 2,703,155 | 9/1959 | Whitefield | 221—115 |
| 3,135,422 | 6/1964 | Woodruff | 221—113 |

ROBERT B. REEVES, Primary Examiner

T. E. KOCOVSKY, Assistant Examiner

U.S. Cl. X.R.

221—112, 253